Clifford B. Bushnell
INVENTOR.

United States Patent Office 3,315,083
Patented Apr. 18, 1967

3,315,083
LIGHT-TIGHT PHOTOELECTRIC FILM READER
Clifford B. Bushnell, Rochester, N.Y., assignor to Eastman Kodak Company, Rochester, N.Y., a corporation of New Jersey
Filed Apr. 24, 1963, Ser. No. 275,401
9 Claims. (Cl. 250—239)

This invention relates to a photoelectric reader and, more particularly, to a photoelectric detector suitable for use in an environment subject to spurious light considerations.

In the manufacturing art, it is often necessary to detect various marks and images on material being processed to determine the position of the material relative to a portion of some downstream manufacturing equipment. In the art of roll film manufacture wherein the film is protected by a backing paper, marks are often used on the back of the backing paper to indicate picture frame indexing numbers, as well as other code markings. Because of the interleaving of the film and paper, inks compatible with the film must be used. Although an infrared light and photocell arrangement can be used to detect code markings without damaging the film, the chemistry of inks and the economics involved usually dictate use of inks which are invisible to infrared light. As a result, since the films are sensitive both to most dyes and to white light, an arrangement must be provided wherein white light is used to detect the code markings on the backing paper with the film being protected at all times from the white light. The problem is further complicated by the fact that the backing paper must be easily accelerated without causing light leaks.

Therefore, an object of my invention is to provide a novel and reliable light-proof photoelectric reader.

In accordance with one embodiment of my invention, a backing paper to be inspected by white light is passed over a flanged idler having a light shield encompassing the paper and a portion of the flange so that in the region of the light shield, white light may be impinged upon the outer surface of the paper for detection of the informational marks thereon without light escaping into the surrounding environment.

Figure 1:
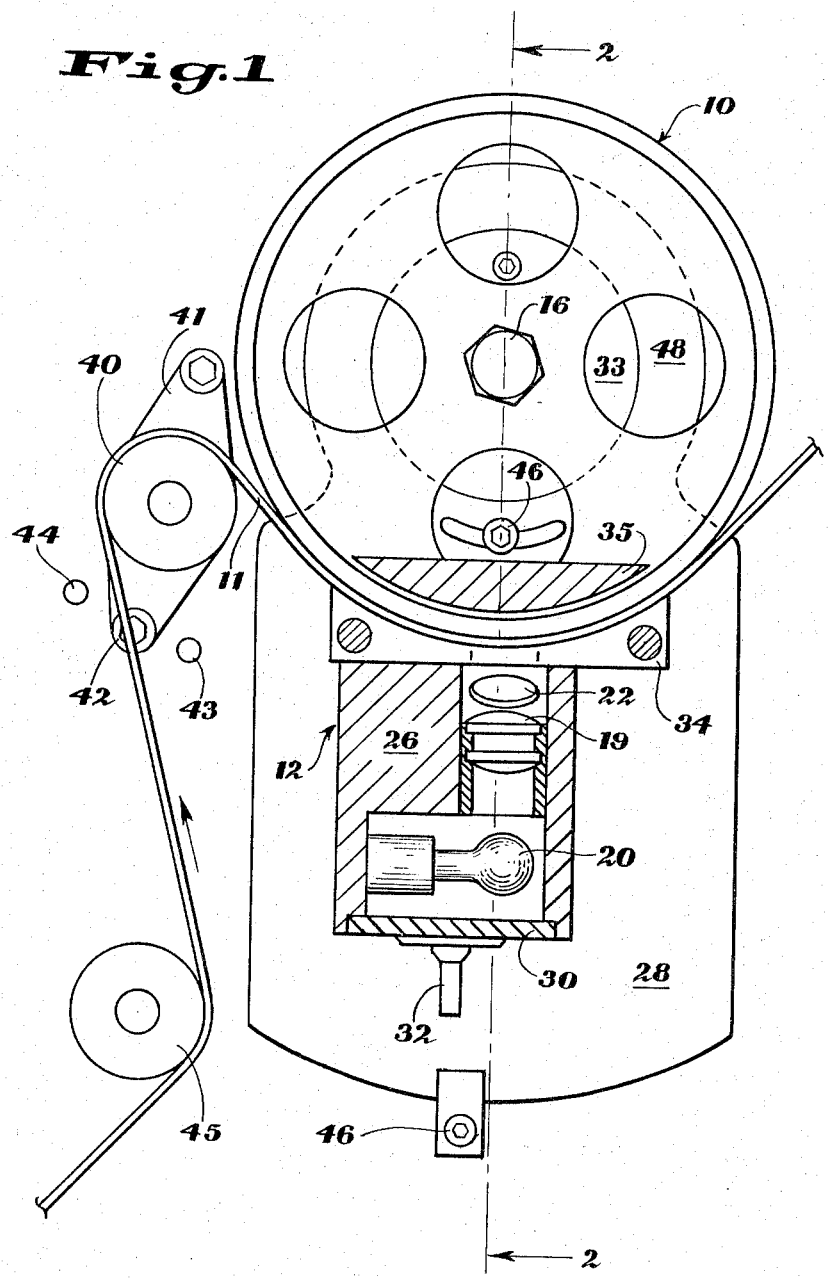
Figure 2:
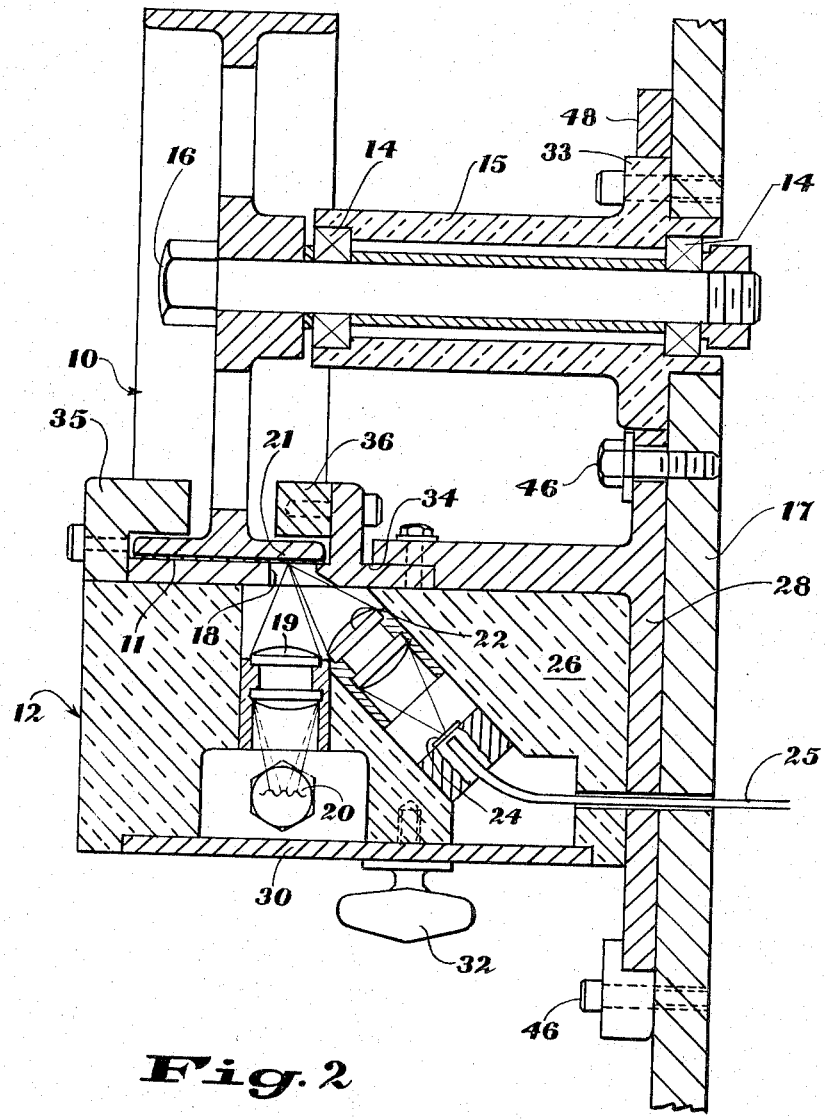

The subject matter which is regarded as my invention is particularly pointed out and distinctly claimed in the concluding portion of this specification. The invention, however, as to its organization and operation together with further objects and advantages thereof, will best be understood by reference to the following description taken in connection with the accompanying drawings in which:

FIG. 1 is a plan view partially in section of one embodiment of my invention; and FIG. 2 is a sectional view taken along the line 2—2 of FIG. 1.

Referring now to the drawings, wherein like numbers refer to similar parts, I have shown in FIGS. 1 and 2 an opaque flanged low inertia idler 10 rotatable to convey a backing paper web 11 past a photoelectric detector arrangement 12 having a detection station associated therewith. In operation, since the backing paper 11 usually must be driven intermittently, I prefer that the idler 10 be driven by the backing paper 11. Therefore, the low inertia of the idler 10 and its support will allow starting and stopping of the backing paper 11 without developing appreciable stress therein.

As shown more clearly in FIG. 2, the idler 10 is rotatably supported by a pair of ball-bearing races 14 mounted in a sleeve 15 to support an idler support shaft in the form of a bolt 16. The sleeve 15 is secured to a support plate 17 and thus supports the idler 10.

The backing paper 11 is conveyed on the outer surface of the idler 10 past an aperture or detection window 18 aligned with an illuminating lens system 19 which directs a portion of the light from a light bulb 20 to a marking region 21 of the backing paper. Thus, the bulb 20 and the lens system 19 selectively illuminate the marking region 21 through the aperture 18. A similar lens system 22 collects light reflected from the marking region 21 and directs it to a photocell 24. When signals are developed because of changes in the light intensity reaching the photocell 24, these signals are conveyed by conductors 25 to other downstream equipment such as cutters and spoolers associated with the backing paper 11. Such downstream equipments usually are used to cut the web 11 into discrete strips and interleave it with the film.

In order to confine the light to a limited region, an opaque housing 26 of the photoelectric detector arrangement is secured to a subplate 28 by bolts or other means. Also, an opaque cover plate 30 is secured by a wing bolt 32 or the like over the access openings to the active elements of the photoelectric detector housing 26, including the light bulb 20 and the photocell 24. The subplate 28 is supported on the plate 17 and positioned tangentially of the idler 10 by rotation about a hub 33 of the sleeve 15. An opaque framing plate 34, which defines the aperture 18, is secured to the subplate 28 so that it is also centered by the sleeve 15. The spacing between the housing 26 and the plate 34 is such that no light may escape therebetween. The plate 34 also supports a flanged guide shoe 35 on one side of the idler 10, and a similar guide shoe 36 on the other side thereof to prevent light leaks from the illuminated marking region 21.

As shown more clearly in FIG. 1, the flanged guide shoe 35 is provided with an arcuate surface which conforms closely to the inner surface of the flange of the idler 10. The guide shoe 36 has a similar configuration. I prefer that the surface of the plate 34 and the flanged guide shoes 35 and 36 be made to have low reflectance by paint or other means to reduce to a minimum the escape of light reflected thereby. Even if light passing through the lens system 19 tends to escape toward the center of the idler 10, it must be reflected several times and will be substantially dissipated by darkened surfaces. The spacing between the flanged guide shoes 35 and 36 and the plate 34 is selected to give sufficient clearance so that there is no frictional contact between the guide shoes and the flange of the idler 10 and so that the backing paper 11 may pass between the outer surface of the idler 10 and the plate 34 without contacting the plate 34. The clearance necessary for one type of backing paper is of the order of .016 inch. Also, I refer that the backing paper width be substantially equal to the overall width of the flange of the idler 10. With the clearances thus provided, little or no light will escape from the detection arrangement 12.

In order that the backing paper 11 may proceed from the detector arrangement 12 of the present invention to a utilization or processing equipment, I prefer that the detecting location be precisely adjustable so that processing of the paper may be accomplished in accordance with the signals developed by the photocell 24 at predeterminable locations. To this end, I have provided a small roller 40 (FIG. 1) secured to a base 41 which is adjustably mounted on the support plate 17 by placing one of the bolts 42 selectively as shown or in one of the threaded apertures 43 and 44. A similar roller arrangement may be provided on the output side of the detection arrangement 12 to provide for a major adjustment of the length of the backing paper between a roller 45 and the utilization equipments. Fine adjustment of the distance between the detection station and downstream utilization equipments is accomplished by moving the photoelectric detector arrangement 12 tangentially about the sleeve 15 by loosening the bolts 46 and moving the subplate 28 to a proper position and again tightening the bolts 46. In many applications, this tangential adjustment will be sufficient without changing the length to the web passing over rollers such as 40 and 45. The spacing of the plate 34 relative to the axis of the idler 10 is maintained during this adjustment operation by the sub-plate 28 being journalled on the hub 33 (FIG. 1) of the sleeve 15, as indicated by the journal portion 48 thereof.

While I have shown and described particular embodiments of the present invention, other modifications may occur to those skilled in this art. For instance, various known means of aligning the backing paper 11 as it approaches the idler 10 may be used with my invention. I intend, therefore, to have the appended claims cover all modifications which fall within the true spirit and scope of my invention.

I claim:
1. A photoelectric reader for developing signal information indicative of marks on one surface of a paper web, comprising:
   a low inertia rotatable flanged idler roller for conveying the paper web past a detection station with the information exposed thereto;
   an opaque plate defining a detection window at the detection station with the window aligned so that the marks pass thereby;
   a pair of guide shoes substantially enclosing the flange of said roller throughout the region of the detection window;
   a light source;
   an opaque housing for said light source secured to said plate so that light may not be admitted therefrom except through the detection window, said pair of guide shoes being arranged to inhibit light leakage from said light source around the flanges;
   a lens system for focusing light from said light source through the detection window;
   a photocell receptive of light reflected from the web for developing signal information indicative of the marks illuminated by said light source; and
   another lens system for collecting light from the paper web passing under the detection window and focusing it on said photocell.

2. A photoelectric reader for developing signal information indicative of marks on one surface of a paper web for use of downstream equipments which operate on the web, comprising:
   a low inertia rotatable flanged idler roller for conveying the paper web past a detection station with the information exposed thereto;
   an opaque plate defining a detection window at the detection station with the window aligned so that the marks pass thereby;
   support means for supporting said plate concentric with said roller, said support means being tangentially adjustable to regulate the distance between the detection window and the downstream equipments;
   a pair of guide shoes substantially enclosing the flange of said roller throughout the region of the detection window and being secured thereto to be adjusted with said support means;
   a light source;
   an opaque housing for said light source secured to said support means so that light may not be admitted therefrom except through the detection window;
   a lens system for focusing light from said light source through the detection window;
   a photocell receptive of light reflected from the web for developing signal information indicative of the printed marks illuminated by said light source; and
   another lens system for collecting light from the paper web passing under the detection window and focusing it on said photocell.

3. A photoelectric reader for developing signal information indicative of marks on one surface of a paper web for use of downstream equipments which operate on the web, comprising:
   a low inertia rotatable flanged idler roller for conveying the paper web past a detection station with the information exposed thereto;
   a sleeve concentric with and rotatably supporting said roller;
   an opaque plate defining a detection window at the detection station with the window aligned so that the marks pass thereby, said plate having an inner surface adjacent to the paper web for a substantial portion of the surface of said roller;
   support means for supporting said plate concentric with said roller, said support means being tangentially adjustable to regulate the distance between the detection window and the downstream equipments;
   a hub concentric with said sleeve for maintaining concentricity of said support means and said plate;
   a pair of guide shoes substantially enclosing the flange of said roller throughout the region of the detection window and being secured thereto to be adjusted with said support means;
   a light source;
   an opaque housing for said light source secured to said support means so that light may not be admitted from said housing except through the detection window;
   a lens system for focusing light from said light source through the detection window;
   a photocell receptive of light reflected from the web for developing signal information indicative of the marks illuminated by said light source; and
   another lens system for collecting light from the paper web passing under the detection window and focusing it on said photocell.

4. A detector for developing signal information indicative of marks on one surface of a paper web for use of downstream equipments which operate on the web comprising:
   a low inertia rotatable flanged idler roller for conveying the paper web past a detection station with the information exposed thereto;
   a sleeve concentric with and rotatably supporting said roller;
   an opaque plate defining a detection window at the detection station with the window aligned so that the marks pass thereby, said plate having an inner surface adjacent to the paper web for a substantial arcuate portion of the surface of said roller;
   support means for suporting said plate concentric with said roller, said support means being tangentially adjustable to regulate the distance between the detection window and the downstream equipments;
   a hub concentric with said sleeve for maintaining concentricity of said support means and said plate;
   a pair of guide shoes substantially enclosing the flange of said roller throughout the region of the detection window and being secured thereto to be adjusted with said support means;
   means for selectively illuminating the paper web in the detection station; and
   means for detecting the reflectance of the illuminated paper web.

5. A detector for developing signal information indicative of marks on one surface of a paper web for use of downstream equipments which operate on the web comprising:
   a low inertia rotatable flanged idler roller for conveying the paper web past a detection station with the information exposed thereto;

a sleeve concentric with and rotatably supporting said roller;

a hub concentric with said sleeve;

support means for supporting the detection station concentric with said roller;

a journal co-operating with said hub to enhance tangential adjustment of said support means to regulate the distance between the detection station and the downstream equipments;

an opaque plate supported by said support means and defining a detection window at the detection station with the window aligned so that the marks pass thereby, said plate having an inner surface adjacent to the paper web for a substantial arcuate portion of the surface of said roller;

a pair of guide shoes substantially enclosing the flange of said roller throughout the region of the arcuate portion and being secured to be adjusted with said support means;

means for selectively illuminating the paper web in the detection station; and means for detecting the reflectance of the illuminated paper web.

6. A detector for developing signal information indicative of marks on one surface of a paper web for use of downstream equipments which operate on the web comprising:

a low inertia rotatable opaque flanged idler roller for conveying the paper web past a concentric detection station with the information exposed thereto;

a hub concentric with said roller;

support means for the detection station journaled on said hub to enhance tangential adjustment of said support means to regulate the distance between the detection station and the downstream equipments without changing the concentricity of the detection station;

an opaque plate supported by said support means and defining a detection window at the detection station with the window aligned so that the marks pass thereby, said plate having an inner surface adjacent to the paper web for a substantial arcuate portion of the surface of said roller;

a pair of guide shoes substantially enclosing the flange of said roller throughout the region of the arcuate portion of said plate and being secured to be adjusted with said support means;

means for selectively illuminating the paper web in the detection station; and means for detecting the reflectance of the illuminated paper web.

7. A detector for developing signal information indicative of marks on one surface of a paper web for use of downstream equipments which operate on the web comprising:

an opaque flanged idler for conveying the paper web past a concentric detection station with the information exposed thereto;

support means for the detection station journaled concentrically with said idler;

an opaque plate supported by said support means and defining a detection window at the detection station, said plate having an inner surface adjacent to the paper web for a substantial arcuate portion of the surface of said idler; and a pair of guide shoes substantially enclosing the flange of said idler throughout the region of the arcuate portion of said plate and being secured to said support means.

8. A detector for developing signal information indicative of marks on one surface of a paper web for use of downstream equipments which operate on the web, comprising:

an opaque detection station;

an opaque flanged idler for conveying the paper web past said detection station with the information exposed thereto;

support means for said detection station journaled concentrically with said idler;

opaque means substantially enclosing the flange of said idler throughout the region of said detection station and being secured to said support means;

means for selectively illuminating the paper web in said detection station; and means for detecting the reflectance of the illuminated paper web.

9. A detector for developing signal information indicative of marks on one surface of a paper web for use of downstream equipments which operate on the web, comprising:

an opaque detection station;

an opaque flanged idler for conveying the paper web past said detection station with the information exposed thereto;

opaque means substantially enclosing the flange of said idler throughout the region of said detection station;

means for selectively illuminating the paper web in said detection station; and means for detecting the reflectance of the illuminated paper web.

References Cited by the Examiner

UNITED STATES PATENTS

| 2,565,266 | 8/1951 | Potts | 250—219 |
| 2,586,666 | 2/1952 | Kuhlik | 250—219 |
| 2,993,118 | 7/1961 | Block et al. | 250—219 |
| 3,046,407 | 7/1962 | Hoffman | 250—219 |

FOREIGN PATENTS

| 663,123 | 7/1938 | Germany. |

RALPH G. NILSON, *Primary Examiner.*

E. STRICKLAND, M. ABRAMSON, *Assistant Examiner.*